No. 793,658. PATENTED JULY 4, 1905.
N. T. HARRINGTON.
COMBINED DISTANCE BAR AND BRAKE BRACE ROD.
APPLICATION FILED OCT. 29, 1904.
2 SHEETS—SHEET 1.
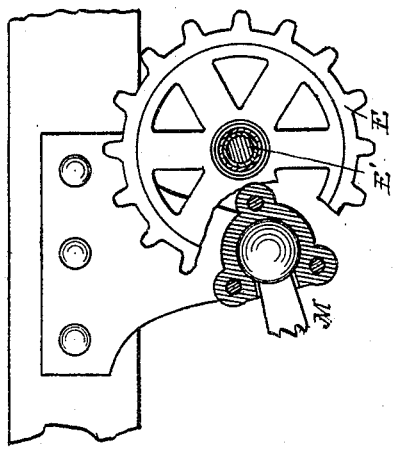
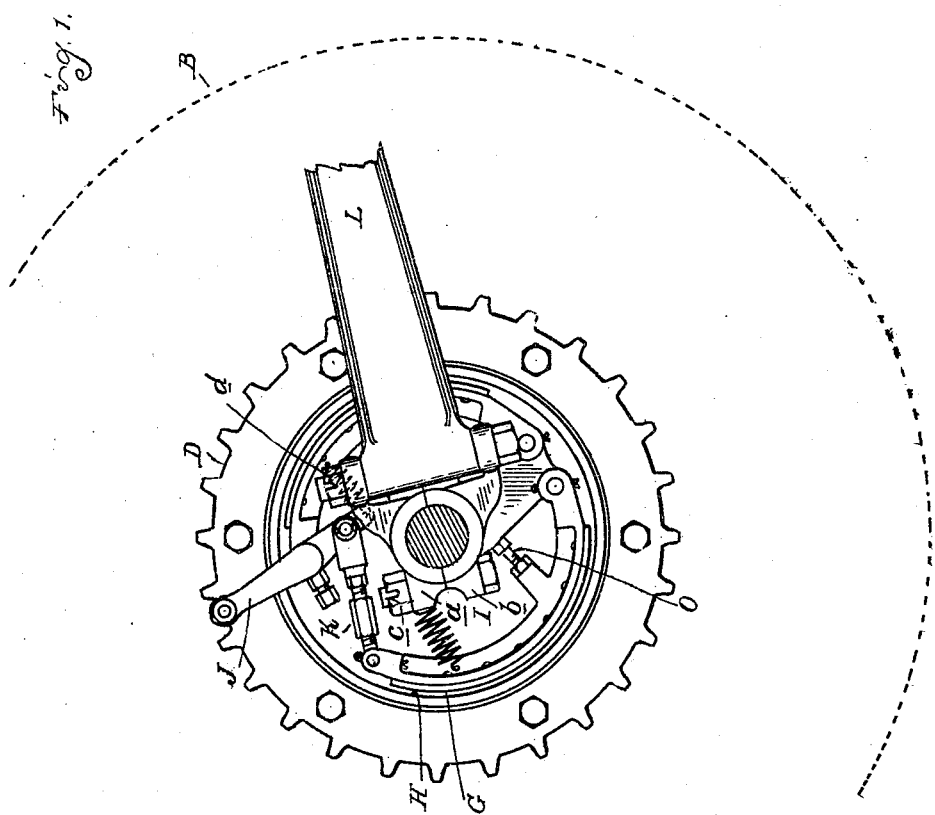
Witnesses
Ed. D. Ault.
Inventor
Norman T. Harrington
By James Whittemore
atty.

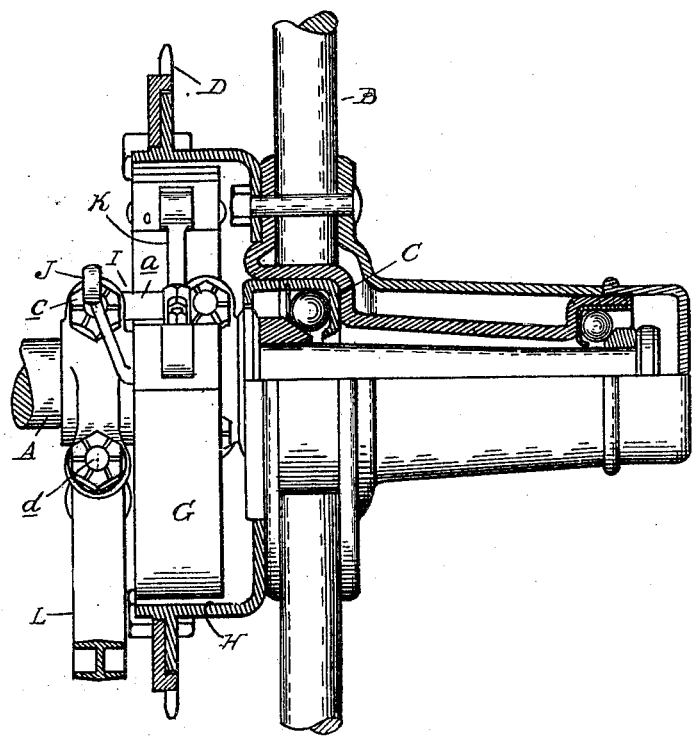

No. 793,658. Patented July 4, 1905.

UNITED STATES PATENT OFFICE.

NORMAN T. HARRINGTON, OF DETROIT, MICHIGAN, ASSIGNOR TO OLDS MOTOR WORKS, OF DETROIT, MICHIGAN, A CORPORATION OF MICHIGAN.

COMBINED DISTANCE-BAR AND BRAKE BRACE-ROD.

SPECIFICATION forming part of Letters Patent No. 793,658, dated July 4, 1905.

Application filed October 29, 1904. Serial No. 230,600.

*To all whom it may concern:*

Be it known that I, NORMAN T. HARRINGTON, a citizen of the United States, residing at Detroit, in the county of Wayne and State of Michigan, have invented certain new and useful Improvements in a Combined Distance-Bar and Brake Brace-Rod, of which the following is a specification, reference being had therein to the accompanying drawings.

The invention relates to motor-vehicles, and has particular reference to the construction of a brake for the drive-wheels or axle.

It is usual in the construction of motor-vehicles to provide brakes which are applied either to the axle or directly to the wheel propelling the vehicle. It is also usual where a chain-drive is employed to provide a distance bar or rod extending from the rear axle to the shaft upon which the drive-sprocket is mounted or to an adjacent point on the frame, so as to prevent change of distance between said shaft and axle. Furthermore, it is necessary to provide a brace or connection for resisting the rotation of the brake-head when the brake is applied, this usually being formed by a separated bar extending longitudinally from the brake-head.

With the present invention the construction is simplified by adapting one bar to perform both the function of the distance-rod and the brace for the brake-head; and the invention consists in the construction as hereinafter set forth.

In the drawings, Figure 1 is a side elevation. Fig. 2 is a sectional plan view.

A is the axle for the drive-wheels of the motor-vehicle of any suitable construction. As shown, this axle is stationary, and the drive-wheels B are suitably mounted thereon, as by a ball-bearing C.

D is the driven sprocket, which is secured to the wheel B, and E indicates the drive-sprocket connected therewith. As shown, an internal brake is provided for each drive-wheel, comprising brake-shoes G, adapted to engage internally with a flange H, to which the sprocket D is secured. The shoes G are pivotally attached to a brake-head I, mounted upon the axle, and are operated by a toggle connection comprising a lever J and link K, pivotally secured to the free ends of the shoes.

L is the combined distance-bar and brace or brake-head. This bar is pivotally connected at one end, preferably by a ball-and-socket joint M, with the frame, upon which a drive-shaft E' is mounted and in a line connecting said shaft with the axle A. The opposite end of the bar L is connected to the head I, preferably by a pivotal connection, which will permit of lateral oscillation of said head, but will prevent rotation thereof upon the axle. To secure greater strength, the bar L is preferably of the tapering form shown, so that its outer end, which connects with the head I, is of considerable width— *i. e.*, in the plane of rotation. This forms, in effect, a truss, which prevents flexing of the bar under the braking stress. The head I extends within the space surrounded by the flange H and is secured to the axle preferably by forming the head into two sections $a$ and $b$, which are clamped upon the axle by bolts $c$. The pivotal connection between the head I and the rod L is formed by a bolt $d$, which passes through ears upon said head and through the rod L, thereby serving both as a clamp and as a pivot. The movement of the brake-shoes is limited by an adjustable stop formed by the screw O engaging one of the shoes and abutting against the head I.

With the construction described it is apparent that the rod L will hold the sprockets D and E at substantially uniform distance from each other during the flexing of the vehicle-springs, which support the vehicle-body and the drive-shaft mounted thereon. At the same time this rod serves to resist the rotation of the head I when the brake-shoes are applied to the flange H.

What I claim as my invention is—

1. The combination with an axle, of a rotary driven member mounted thereon and provided with an internal brake-surface, cooperating brake-shoes for engaging said surface, a member rigidly clamped upon said axle extending within the space inclosed by said brake-surface and forming a fulcrum for said brake-shoe, and a rod I-shaped in cross-section and longitudinally tapering pivotally connected to said member and extending therefrom perpendicular to said axle, forming a combined distance-bar and brace, whereby relative movement of said axle, the member clamped thereon, and rod, is prevented, in the plane of rotation of said driven member.

2. The combination with an axle, of a rotary driven wheel mounted thereon and provided with a brake-surface, a coöperating brake-shoe, a member mounted upon said axle forming a fulcrum for said shoe and a tapered rod extending radially from the axle, connected to said member to rigidly brace the same in the plane of rotation while permitting movement transverse to said plane.

3. The combination with an axle, of a rotary driven wheel mounted thereon and provided with a brake-surface, a coöperating brake-shoe, a member mounted upon said axle, forming a fulcrum for said shoe and a tapered rod pivotally connected to said member on opposite sides of the axle and in the plane of rotation, whereby said member is rigidly braced by said rod in the plane of rotation and has a free lateral movement transverse to said plane, said rod being I-shaped in cross-section and presenting its greatest depth against the braking stress, substantially as described.

4. The combination with an axle, of a rotary driven member mounted thereon, provided with an internal brake-surface a second member clamped upon said axle and extending within the space encircled by said brake-surface, a brake-shoe pivoted to said member and coöperating with said brake-surface and a tapered rod extending in the plane adjacent to said rotary driven member radially from said axle and pivotally connected to said clamped member to permit of relative movement transverse to the plane of rotation, while acting as a truss forming a rigid brace in said plane.

5. The combination with a drive-shaft and a revoluble driven wheel bearing a brake-surface, of an axle upon which said driven wheel is mounted, a stationary head bearing coöperating brake members and clamped on said axle, and a longitudinally-tapered truss-rod, alined between said axle and drive-shaft, having one end pivoted on said stationary head, permitting lateral movement but rigid in the plane of rotation of said brake-surface, for the purpose described.

In testimony whereof I affix my signature in presence of two witnesses.

NORMAN T. HARRINGTON.

Witnesses:
EDWARD D. AULT,
H. C. SMITH.